United States Patent [19]

Rose et al.

[11] Patent Number: 5,407,450
[45] Date of Patent: Apr. 18, 1995

[54] METHOD FOR THE ASSEMBLY OF LEAD-ACID BATTERIES AND ASSOCIATED APPARATUS

[75] Inventors: Michael V. Rose, Pittsburgh; Daniel E. Smith, Erie, both of Pa.

[73] Assignee: Sealed Energy Systems, Inc., Pittsburgh, Pa.

[21] Appl. No.: 277,717

[22] Filed: Jul. 20, 1994

Related U.S. Application Data

[60] Division of Ser. No. 828,907, Jan. 29, 1992, Pat. No. 5,344,466, which is a continuation-in-part of Ser. No. 546,927, Jul. 2, 1990, Pat. No. 5,025,551, which is a division of Ser. No. 464,104, Jan. 12, 1990, Pat. No. 4,973,335.

[51] Int. Cl.⁶ .............................................. G01N 27/26
[52] U.S. Cl. ........................................ 29/730; 29/623.1
[58] Field of Search ..................... 29/730, 731, 623.1, 29/428, 791, 783, 771, 742, 819; 271/3, 8.1, 9

[56] References Cited

U.S. PATENT DOCUMENTS

| | | | |
|---|---|---|---|
| 4,479,300 | 10/1984 | Savage | 29/730 |
| 4,510,682 | 4/1985 | Sabatino et al. | 29/730 |
| 4,583,286 | 4/1986 | Schaumburg et al. | 29/730 |
| 4,973,335 | 11/1990 | Rose et al. | 29/730 |
| 5,025,551 | 6/1991 | Rose et al. | 29/730 |
| 5,344,466 | 9/1994 | Rose et al. | 29/730 |

*Primary Examiner*—John Niebling
*Assistant Examiner*—Bruce F. Bell
*Attorney, Agent, or Firm*—Arnold B. Silverman

[57] ABSTRACT

A method of making a lead-acid battery includes providing continuous lengths of end separator stock (24) and intermediate separator stock (26) and stacks of positive (81,98) and negative plates (83,93) with optional use of end separators. The separators are individually severed from the continuous length of stock and sequentially formed into an assembly with the individual positive and negative plates. The assembly is introduced into a battery cell container (28). A plurality of assemblies may be established prior to introduction into the battery cell container (28). In a preferred embodiment, the assembly zone (38) moves linearly relative to the cutting stations for the respective continuous lengths of separator stock and the stacks of plates and facilitates sequential establishment of the assembly without intermediate storage of the individual separators and elements. Some or all of the separators may be supplied from stacks disposed in magazines. The magazines (84,84A,85,85A) may have more than one stack of plates of the same charge to facilitate supply by one while the other is replenished. The stacked plates (81,83,93,98) preferably have their lugs (81a,83a,93a,98a) aligned.

The apparatus includes equipment (98) for supplying continuous lengths of end separator stock (24) and intermediate separator stock (26) and positive and negative plate stacks (81,83,93,98). The separators may be provided from stacks, if desired. A movable assembly zone (38) is adapted to receive the individual separators and plates from which the assembly may be introduced into a battery cell container (28).

17 Claims, 9 Drawing Sheets

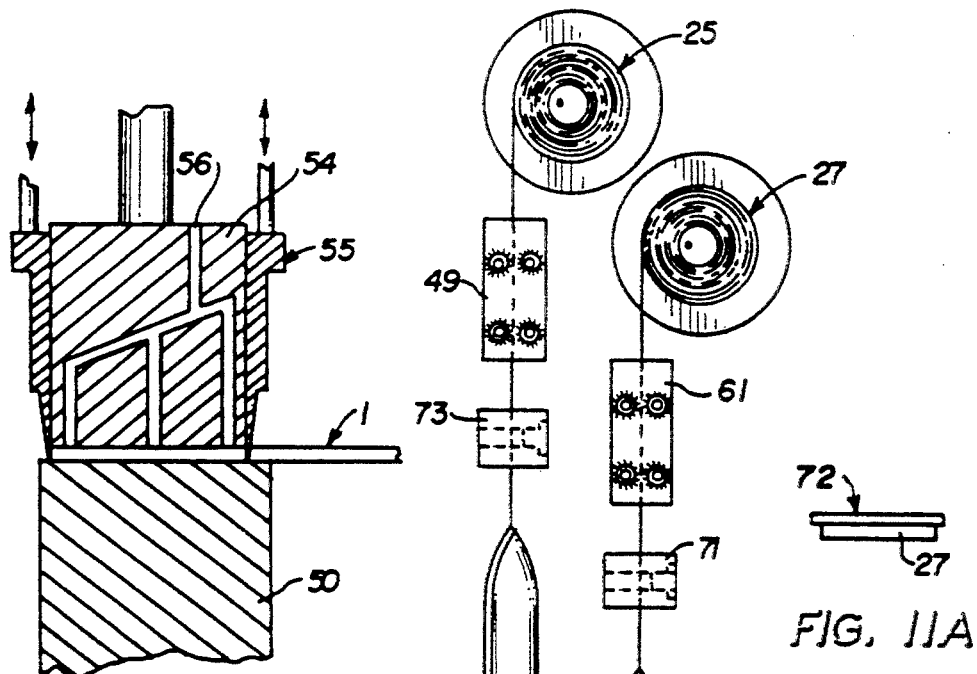
FIG. 9
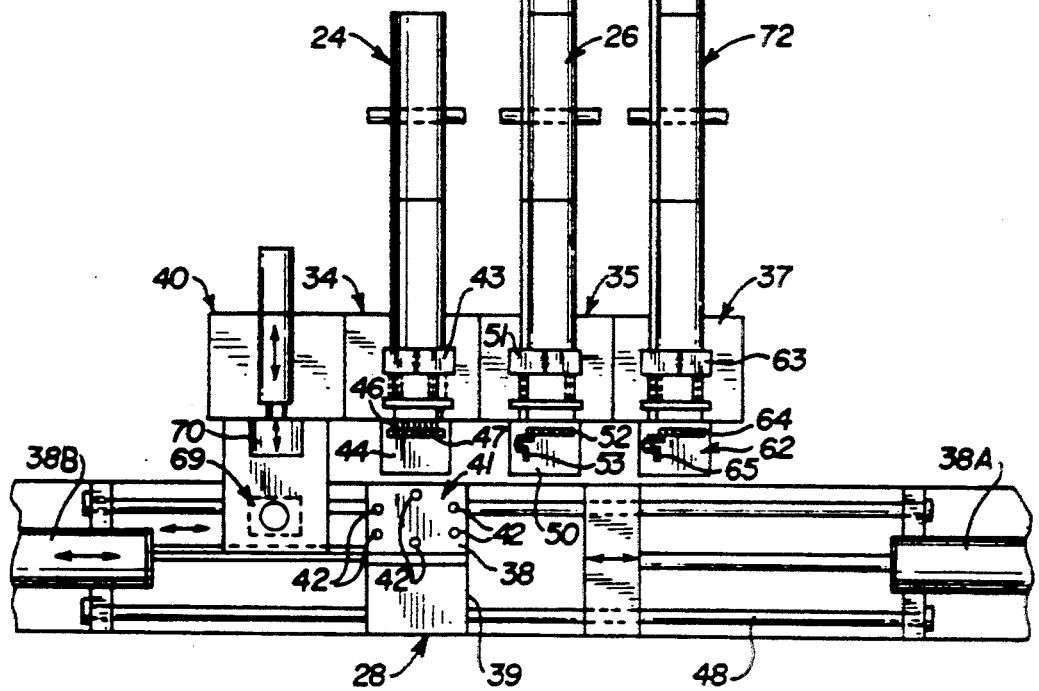
FIG. 11A
FIG. 11

METHOD FOR THE ASSEMBLY OF LEAD-ACID BATTERIES AND ASSOCIATED APPARATUS

RELATED APPLICATIONS

This application is a divisional application of U.S. Ser. No. 07/828,907, filed Jan. 29, 1992, now U.S. Pat. No. 5,344,466, which was a continuation-in-part of U.S. Ser. No. 07/546,927, filed Jul. 2, 1990, now U.S. Pat. No. 5,025,551, which was a divisional application of U.S. Ser. No. 07/464,104, filed Jan. 12, 1990, now U.S. Pat. No. 4,973,335.

BACKGROUND OF INVENTION

1. Field of Invention

This invention relates to an improved method for the assembly of lead-acid batteries and an apparatus related thereto. More specifically, the invention relates to a flexible, high speed method for the manufacture of lead-acid batteries in a wide variety of sizes and configurations from continuous lengths of battery plate stock and related means.

2. Description of the Prior Art

Conventional lead-acid storage batteries generally consist of a plurality of alternating flat pasted positive plates and flat pasted negative plates which are electrically insulated from one another by a porous separator material. The cell assembly so constituted is placed into a suitable container in which the positive and negative plates are brought into contact with a sulfuric acid electrolyte. In batteries containing free electrolyte, the cell assembly is generally fully immersed in the sulfuric acid. In batteries containing no free electrolyte, the sulfuric acid is fully absorbed in the plates and separator material.

The prior art method of manufacturing storage batteries of the type described hereinabove, generally involves alternately stacking cured pasted positive plates and cured pasted negative plates to form a cell assembly in which each positive plate is separated from each negative plate by a porous separator material. The cell components are aligned such that all of the positive current collecting lugs are aligned with one another. All of the negative current collecting lugs are aligned with one another in a region significantly separated from the plane of the aligned positive lugs. The porous separator material overlaps the plates on four sides to provide effective electrical insulation. The positive lugs are electrically connected to one another and the negative lugs are electrically connected to one another by means of separate electrically conductive plate straps. The completed cell assembly is placed in a battery container. If the battery contains more than one cell, intercell electrical connections are then made and the battery container and cover are sealed together. The sulfuric acid electrolyte is next added to the battery and the plates are electrochemically formed. Following electrochemical formation, the acid used for formation may be removed from the battery and replaced with sulfuric acid of a different specific gravity. The battery is then washed and dried, vent caps are installed, and the final production steps are completed.

An alternative method of manufacture involves the use of individual positive and negative plates that have been electrochemically formed, washed and dried prior to cell assembly. This method eliminates the need to electrochemically form the plates in the battery container, thereby increasing the speed and minimizing the cost of final assembly. These cost savings are generally offset, however, by the added cost of additional handling of the very large number of individual plates involved prior to the cell assembly operation.

Generally, pasted battery plates are cured and, if electrochemically formed prior to assembly, formed as "doubles", i.e., two attached plates which must be separated prior to the cell assembly step. One method of separating paired battery plates which is disclosed in U.S. Pat. No. 4,285,257, involves a rotary cutting blade which separates a stack of paired plates into two stacks of individual plates of the same polarity which represent the starting material for commonly used cell assembly processes, such as those described in U.S. Pat. Nos. 4,784,380, 4,720,227, 4,728,093, 4,534,549, 4,168,772, and 3,982,624. All of these methods and related apparatus utilize feedstock consisting of stacks of singular negative plates, stacks of singular porous separator pieces, and stacks of singular positive plates which are automatically combined on a conveyor to progressively form cell assemblies containing the desired number of positive plates, negative plates, and separator pieces which normally overlap the positive and negative plates on four sides. The battery cell assemblies so produced must be removed from the conveyor and the positive and negative plate lugs aligned in a separate operation prior to the subsequent production steps of forming the positive and negative plate straps and inserting the completed cell assembly into the battery container.

U.S. Pat. Nos. 4,479,300, 4,510,682, and 4,583,286 describe alternative methods and apparatus for the production of a lead-acid battery cell assembly which involve building a cell assembly from a plurality of positive plates obtained from a source of individual positive plates, a plurality of negative plates obtained from a source of individual negative plates, and a continuous length of porous separator material containing accordion-type folds. In this construction, the positive and negative plates are located within accordion folds and are on opposite sides of the separator from one another. The cell assemblies so produced are subjected to additional production steps in which the positive plate lugs and negative plate lugs are properly aligned, the cell assembly is taped together to hold the alignment during the subsequent and separate production steps of forming the plate strap and inserting the taped cell assembly into the battery container.

Another known method for the production of lead-acid battery cell assemblies from stacks of singular positive plates, stacks of singular negative plates, and a continuous length of porous separator material involves properly locating a positive plate on top of a piece of separator material cut from said continuous length such that the length of the cut piece is at least twice the height of said positive plate, folding the separator material over the bottom of said positive plate and sealing it on both sides to form a 3-sided envelope, properly positioning said negative plate relative to the envelope containing the positive plate, and repeating these steps until the cell assembly contains the desired number of positive and negative plates. A rotary apparatus utilized in this production method, described in U.S. Pat. No. 4,822,834, removes the aforesaid battery plates from the stacks of individual plates of singular polarity and positions the plates relative to the separator and each other.

Cell assemblies produced in accordance with the above method and apparatus must be physically removed from the apparatus and subjected to separate production steps in which the positive and negative plate lugs are aligned, the plate straps are formed, and the cell assembly is inserted into the battery container. U.S. Pat. No. 4,824,307 describes a method and apparatus for automatically transporting and aligning said cell assemblies prior to subjecting them to a means for forming the positive and negative plate straps.

All of the hereinbefore described methods and apparatus involve extensive and costly handling of paired and singular plates prior to cell assembly and each requires additional production steps to align the plate lugs and insert the cell assembly into the battery container. Further, each requires a significant expenditure in dust control equipment in order to comply with mandated lead-in-air standards when as-cured plates are being handled.

A method and apparatus for the production of lead-acid battery cell assemblies from continuous lengths of cured battery plate stock and continuous lengths of separator material, is disclosed in U.S. patent application Ser. No. 315,722, now U.S. Pat. No. 4,982,482. In this method, the required lengths of a plurality of cell components: e.g. a length of cured positive plate stock, a length of porous separator material, a length of cured negative plate stock, and a second length of porous separator material, all of which represent only a portion of the total number of cell components in the completed cell assembly, are indexed into a cutting chamber and simultaneously cut to length by a single cutting mechanism. The subassembly so produced is next transported to a stationary accumulation chamber where it is stored to await the cutting and transport of the remaining portions of said cell assembly. The process is then repeated until all of said portions are in the stationary accumulator chamber after which the components are moved as a unit into an alignment chamber in which the positive and negative plate lugs are aligned and the desired degree of separator overlap relative to each plate is achieved. The final cell assembly also contains two rigid end-plates, each containing outwardly projecting "wings", which are taped tightly circumferentially in a separate step and which, together with the plate and separator assembly, make up a rigid self-contained unitized cell module which can be easily handled during subsequent manufacturing steps which include insertion of the cell assembly into the battery container, formation of the positive and negative plate straps, formation of intercell connectors, sealing of the top cover to the cell container, addition of electrolyte, and electrochemical formation of the plates in the container. Upon completion of formation, the battery is washed and dried and final assembly is completed.

Although this method eliminates the heretofore described economic and ecological problems inherent in the cutting and handling of singular and paired battery plates, it still requires that a plurality of cell sub-assemblies be fabricated and transported to, and accumulated in, a stationary chamber; the final cell assembly be re-aligned after all sub-assemblies have been accumulated; separate rigid winged end-plates provide cell compression and hold the cell firmly in the container, and that the cell assembly be rigidified by taping in order to facilitate handling during transport to, and insertion of the completed cell assembly into, the battery container. Further, the need to electrochemically form the cured plates in the battery container prior to final assembly interrupts the smooth flow of the subsequent assembly steps and increases the cost of manufacture.

None of these prior art cell assembly methods are adapted to achieving the required alignment of the cell components during the cell assembly operation, building a cell stack and inserting the stack into the battery container in a single continuous operation, and continuous "downstream" assembly operations that are uninterrupted by the need to electrochemically form the plates after insertion of the cell assembly into the battery container. There remains, therefore, a need for a practical method of properly aligning the positive and negative plate lugs during the cell assembly process, placing the completed cell stack directly into the battery container as the last step in the cell assembly process, and eliminating the need to electrochemically form the plates in the battery container. A process incorporating these improvements would substantially reduce the cost of producing lead-acid batteries and greatly improve worker safety.

SUMMARY OF INVENTION

The present invention has met the hereinabove described needs. The invention provides a method for the automated manufacture of lead-acid battery cell assemblies from continuous lengths of electrochemically formed battery plate stock, such as that described in U.S. patent application Ser. No. 361,029, now U.S. Pat. No. 5,001,025 and continuous lengths of porous separator material. Cell assembly is preferably achieved by cutting individual battery plates from the continuous lengths of the electrochemically formed plate stock and directly transporting said individual battery plates to a movable component assembly chamber without the need for intermediate storage. The movement of said component assembly chamber is controlled such that cut positive plates and cut negative plates are stacked alternately therein such that the adjacent surfaces of each cut positive plate and each cut negative plate are separated by a cut piece of porous separator material.

In another embodiment some of the plates or separators, may be supplied from supply chambers or magazines with others being provided by severing continuous plate stock. In the alternative, all plates may be pre-cut and supplied from magazines.

The present system preferably incorporates means for properly aligning the current carrying lugs of all positive plates and all negative plates within the component assembly chamber and means for compressing and inserting the completed cell assembly into the battery container without intermediate handling, transport, or storage.

It is an object of the present invention to provide a method and apparatus for assembling lead-acid batteries from continuous lengths of battery plate stock, including electrochemically formed battery plate stock.

It is another object of this invention to provide a manufacturing system in which battery plates produced from continuous lengths of electrochemically formed battery plate stock are placed directly into a cell assembly means without the need for intermediate handling, transport, or storage.

It is a further object of this invention to provide a system for properly aligning the positive plate lugs and the negative plate lugs during the cell assembly operation.

It is a further object of this invention to provide a means of inserting a completed cell assembly directly into a battery container without intermediate handling, transport, or storage.

It is a further object of this invention to provide a high speed, economical, automated method of manufacturing lead-acid batteries.

It is a further object of this invention to provide a method of making lead-acid batteries of improved quality and consistency.

It is a further object of this invention to provide a system that supplies some or all of the plates from plate containing chambers or magazines.

These and other objects of the invention will be more fully understood from the following detailed description of the invention and reference to the illustrations appended hereto.

BRIEF DESCRIPTION OF THE DRAWINGS

FIG. 9 is a cross-sectional illustration of a form of cutting die.

FIG. 11 is a schematic plan view of a second embodiment of the invention.

FIG. 11A is a partial cross-sectional view of a plate-separator lateral combination.

DESCRIPTION OF PREFERRED EMBODIMENTS

As employed herein, the expression "electrochemically formed battery plate stock" will refer to battery plate stock which has been subjected to electrochemical formation sufficient to convert a substantial portion of the active material of positive plate stock to lead dioxide and a substantial portion of the active material of negative plate stock to metallic lead.

As employed herein the expression "continuous length of electrochemically formed plate stock" will refer to battery plate stock that is electrochemically formed battery plate stock and is of sufficient size that a plurality of battery plates may be obtained therefrom by severing the stock at pre-determined lengths.

FIGS. 1 through 4 illustrate a lead-acid battery cell assembly containing positive battery plates and negative battery plates severed from continuous lengths of electrochemically formed plate stock and constructed in accordance with the method of this invention.

Figure 1:
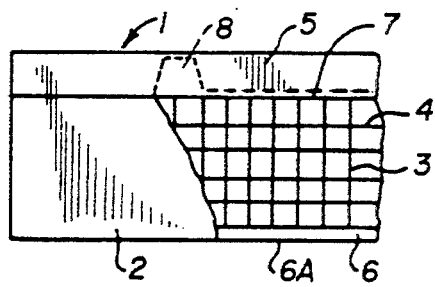
FIG. 1 is a schematic illustration of a portion of a continuous length of battery plate stock.

FIG. 1 illustrates a continuous length of electrochemically formed battery plate stock 1 from which a plurality of battery plates can be severed. Battery plate stock 1 consists of a layer of cured and electrochemically formed battery paste 2 (of a composition selected to achieve the desired polarity of the plate stock after electrochemical formation), which is secured to a continuous length of battery grid strip 3. The battery grid strip 3 consists of a reticulated grid portion 4, having secured thereto on one side an integral lug portion 5, and an integral bottom border portion 6 which has an edge section 6A on the other side. The lug portion 5 may be continuous and of constant height along the length of grid strip 3, as shown, or may consist of a top border portion 7 with a plurality of individual plate lugs 8 spaced periodically along the length of said grid stock and projecting therefrom, as shown by the broken lines in FIG. 1. The continuous grid strip 3 may be produced by continuous casting, metal expansion of as-cast or wrought sheet, or by any other suitable process used for the production of battery grid strip in relatively continuous form. The number, size, shape, and pattern of the wires making up reticulated grid portion 4 may be of any desired configuration that is suitable for the manufacture of battery plates.

Figure 2:
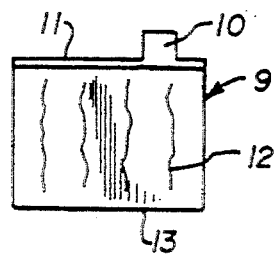
FIG. 2 is a front elevational view of an individual battery plate.
Figure 2A:
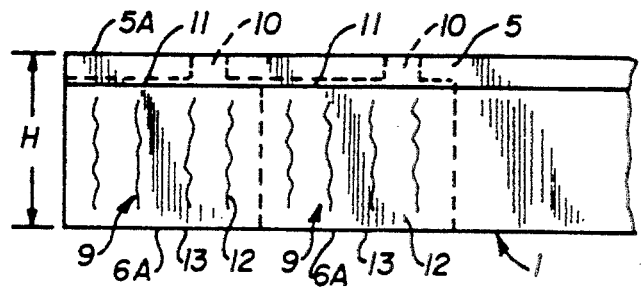
FIGS. 2A and 2B illustrate continuous lengths of battery plate stock and contains indications of shapes of battery plates which may be severed therefrom.
Figure 2B:
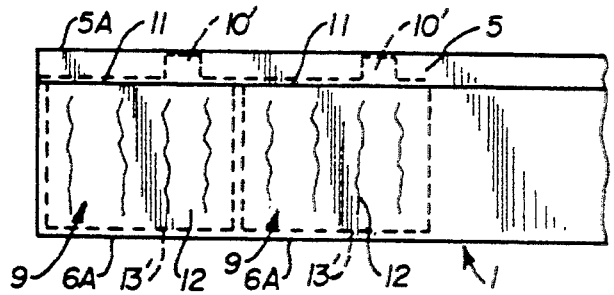

FIG. 2 illustrates a battery plate 9 produced by severing said plate from a continuous length of battery plate stock 1. Battery plate 9 contains an upwardly projecting lug 10 and a top border 11 which have been severed from lug portion 5 of battery plate stock 1, an electrochemically formed paste portion 12 which has been severed from the pasted reticulated grid portion 3 of continuous battery plate stock 1 and a bottom edge 13. As illustrated in FIGS. 2A and 2B, the distance between the bottom edge 13 of the pasted portion 12 and the top border 11 of battery plate 9 may be equal to or less than the distance H between the bottom edge 6A and the upper edge 5A of lug strip 5 of the continuous battery plate stock 1 from which the battery plate 9 was severed.

In the form shown in FIG. 2A, the plates to be severed are shown in dashed lines and will have the severed plates the full height H. The lower edge 13 of the plate is at stock edge 6A and the upper edge of tab 10 is at edge 5A.

In the form shown in FIG. 2B, the plates to be severed as shown in dashed lines have tabs 10′ with an upper edge below edge 5A and a lower edge 13′ above edge 6A.

Figure 3:
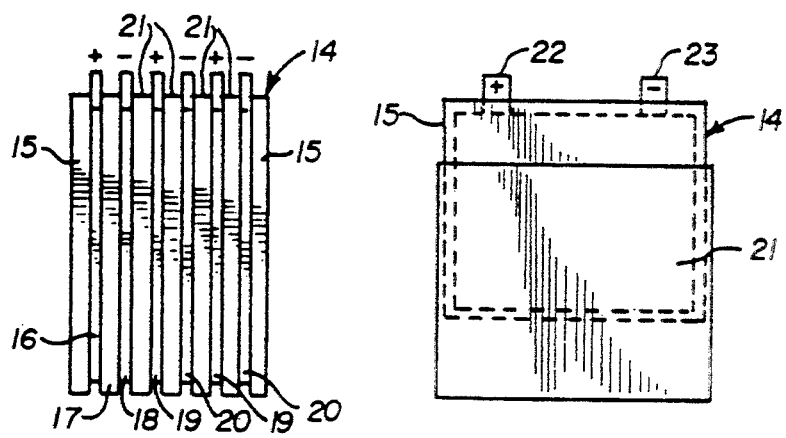
FIG. 3 is a schematic side elevational view of a cell assembly.

A cell assembly 14 constructed by the method of this invention is illustrated in FIG. 3. Cell assembly 14 has two end electrically insulative separators 15, a first positive battery plate 16 which has been severed from a continuous length of electrochemically formed positive battery plate stock, an intermediate electrically insulative separator 17, and a first negative battery plate 18 which has been severed from a continuous length of electrochemically formed negative battery plate stock. The plates and separators are preferably in surface-to-surface contact. The element may be further comprised of additional alternating positive battery plates 19 and negative battery plates 20 which have been severed from continuous lengths of electrochemically formed battery plate stock and which are separated by additional intermediate separators 21. The end separators 15 and the intermediate separators 17 and 21 are preferably composed of compressible fibrous porous mats such as those constructed from glass or polymer fibers, but they may also be constructed from microporous polymeric sheet materials such as polyethylene or polyvinylchloride, for example. Intermediate separators 17 and 21 may have a thickness equal to, less than, or greater than the thickness of end separators 15. End separators 15 and intermediate separators 17 and 20 may extend beyond the top edge, bottom edge, and both side edges of battery plates 16, 18, 19, and 20; or beyond only the top edge and the bottom edge of said battery plates while being flush with the two side edges; or beyond only one edge of the positive and negative battery plates while being flush with the remaining three edges of said plates.

Figure 4:
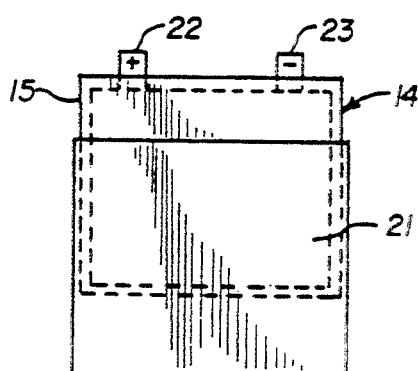
FIG. 4 is a schematic elevational view of a cell assembly extending into a battery container.

FIG. 4 illustrates a cell assembly 14 partially inserted into a battery container 21 in a manner such that all of the positive battery plate lugs 22 are properly aligned, all of the negative battery plate lugs 23 are properly aligned, and the aligned positive plate lugs and aligned negative plate lugs are properly situated within the cell assembly so that formation of the positive plate straps and negative plate straps can be achieved without further movement of said plate lugs. Aligned lugs 22 are laterally spaced from aligned lugs 23.

The present invention provides a single integrated continuous method of manufacturing a lead-acid battery cell assembly of the type heretofore described and inserting said assembly into a battery container which preferably includes the steps of:

(a) Severing an individual piece of battery end separator material from a continuous length of porous end separator stock to form an end separator, directly transporting the end separator to a mobile cell assembly chamber which has been positioned to receive the end separator, and inserting said end separator into the mobile cell assembly chamber; and (b) Severing an individual piece of positive battery plate stock from a continuous length of electrochemically formed positive battery plate stock to form a positive battery plate, directly transporting the positive battery plate to the mobile cell assembly chamber which has been positioned to receive the positive battery plate, and inserting the positive battery plate into said mobile cell assembly chamber such that is adjacent to the end separator and accurately positioned such that the lug portion of said positive battery plate will be properly aligned with the lug portion of any additional positive battery plates which may subsequently be inserted into the mobile cell assembly chamber; and (c) Severing an individual piece of battery intermediate separator material from a continuous length of porous intermediate separator stock to form an intermediate separator, directly transporting the intermediate separator to the mobile cell assembly chamber which has been positioned to receive the intermediate separator, and inserting the intermediate separator into the mobile cell assembly chamber; and (d) Severing an individual piece of negative battery plate stock from a continuous length of electrochemically formed negative battery plate stock to form a negative battery plate, directly transporting said negative battery plate to the mobile cell assembly chamber which has been positioned to receive said negative battery plate, inserting said negative battery plate into the mobile cell assembly chamber such that is adjacent to the aforesaid intermediate separator and accurately positioned such that the lug portion of the negative battery plate will be properly aligned with the lug portion of any additional negative battery plates which may subsequently be inserted into said mobile cell assembly chamber. Step (a) is repeated with end separator placed adjacent to the exterior of said negative battery plate.

FIGS. 5 through 10 illustrate in greater detail various aspects of the method of manufacturing a cell assembly 14.

Figure 5:
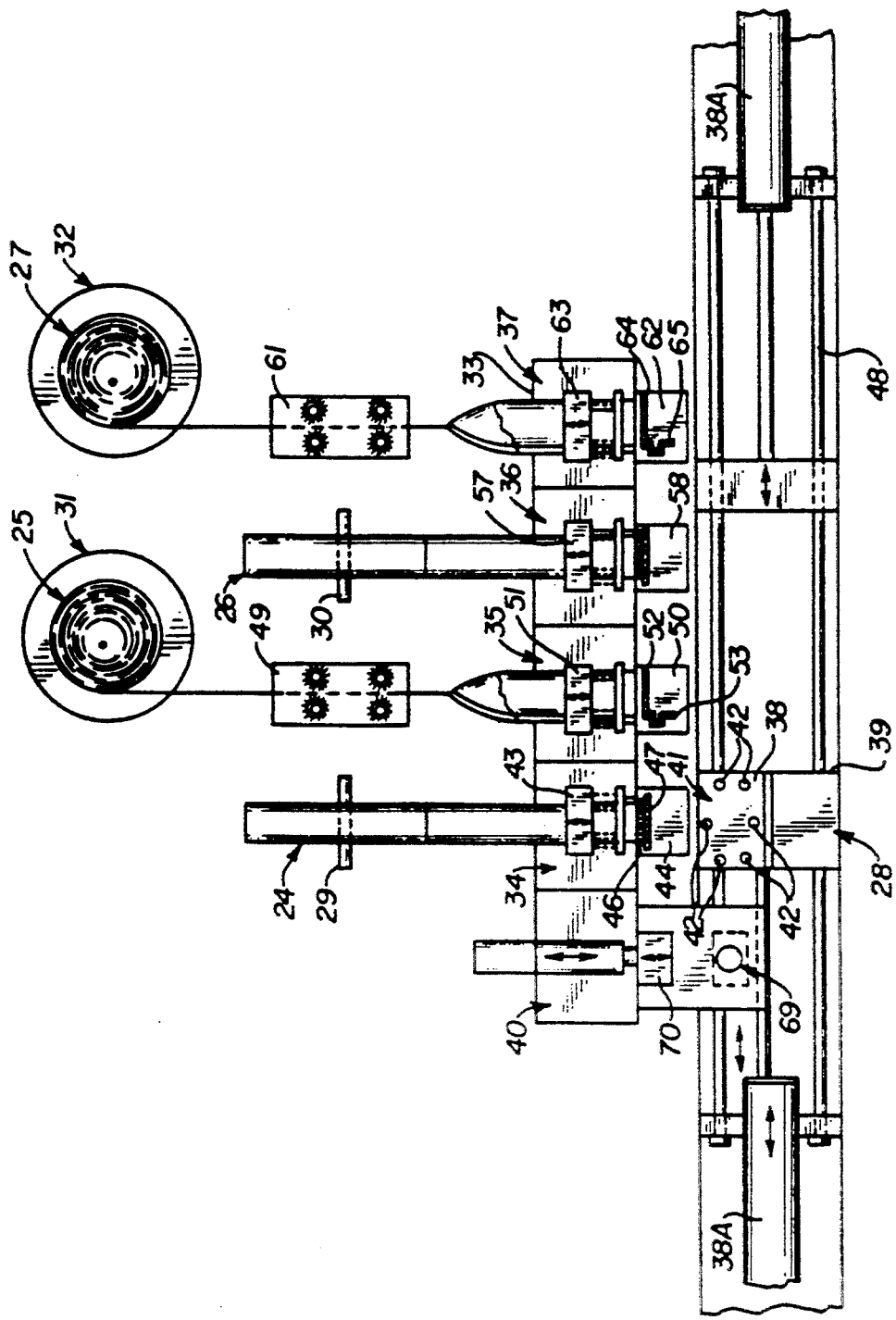
FIG. 5 is a schematic plan illustration of a system employed in practicing the present invention.
Figure 6:
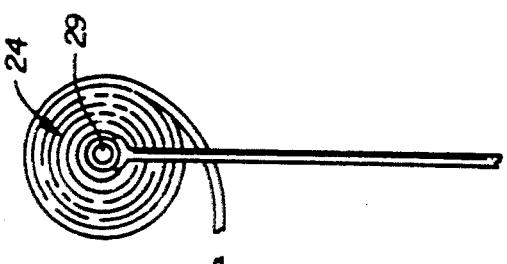
FIG. 6 is a partially schematic illustration of a portion of the apparatus of FIG. 5.
Figure 6:
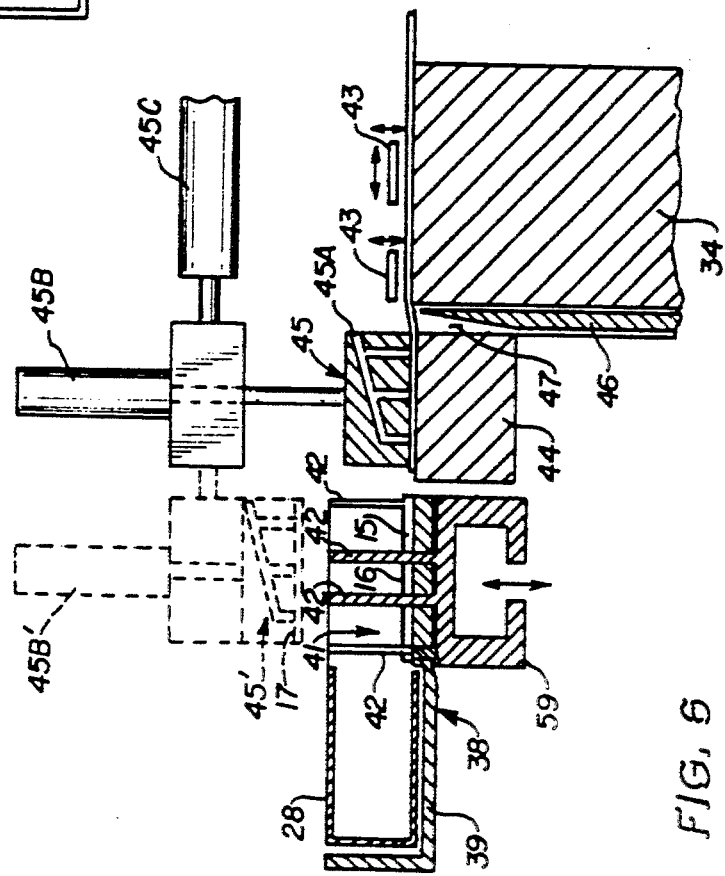

Referring to FIGS. 5 and 6, the materials from which the components of cell assembly 14 are produced include a continuous length of porous end separator material 24, a continuous length of electrochemically formed battery plate stock of a first polarity 25, a continuous length of porous intermediate separator material 26, a continuous length of electrochemically formed battery plate stock of a second polarity 27, and a battery container 28. It is preferred that said continuous lengths of end separator material and intermediate separator material be in the form of coils or traverse wound spools and that said coils or spools be positioned on uncoiling means 29 and 30, respectively. The axes of the coils or spools may be essentially vertical, essentially horizontal, or inclined at a convenient angle therebetween. It is preferred that said continuous lengths of positive and negative battery plate stock be in the form of coils and that said coils be, positioned on uncoiling means 31 and 32, respectively, such that the axis of each coil is essentially vertical and the lug strip 5 is positioned in a generally downward direction.

The uncoiling means for the battery plate stock and for the separator materials may be powered in order to control the length of material uncoiled at a specific time or unpowered such that the length of material uncoiled at a specific time is controlled by another mechanism.

Construction of cell assembly 14 and the insertion of said cell assembly into battery container 28 are accomplished in a single continuous operation utilizing a cell assembly means 33 comprised of an end separator fabrication station 34, a first polarity plate fabrication station 35, an intermediate separator fabrication station 36, a second polarity plate fabrication station 37, a mobile cell assembly chamber 38 containing a battery container support means 39, and a battery container loading station 40.

In addition to a battery container support means 39, the mobile cell assembly chamber 38 contains an enclosure 41 into which the individual separator pieces and battery plates are sequentially placed and an alignment means that positions the first polarity plates and the second polarity plates such that the lugs of the first polarity plates 22 (shown in FIG. 4 as positive plate lugs 22) and the lugs of the second polarity plates 23 (shown in FIG. 4 as negative plate lugs 23) are properly aligned and do not have to be repositioned prior to fabrication of the positive and negative plate straps which will be secured to them. Further, the alignment means position said plates of opposite polarity relative to separators 15, 17, 21 (see FIG. 3) such that the desired degree of separator overlap is achieved. One such alignment means, illustrated in FIG. 5, consists of retractable plate alignment pins 42 which are inserted into the cell assembly enclosure 41 prior to introduction of said battery plates therein. The alignment pins 42 may be retracted from the enclosure after all of the cell components have been placed therein and prior to insertion of said cell assembly into the battery container 28. Insertion of said alignment pins into the enclosure 41, and retraction therefrom, may be accomplished by the use of an air-actuated cylinder or mechanical means well known to those skilled in the art.

The battery container support means 39 positions the battery container 28 such that the open end of said container faces the cell assembly enclosure 41 and is aligned therewith such that the cell assembly 14 may be inserted snugly into the battery container 28 without damage to any of the cell components as disclosed hereinafter.

The mobile cell assembly chamber 38 is provided with indexing means such that it may be sequentially transported to, and aligned with, fabrication stations 34, 35, 36, 37, and 40. The indexing means may be comprised of air-actuated cylinders 38A and mechanical stops mounted to slide mechanism 48, as shown in FIG. 5, a mechanical cam-activated drive, or any other mechanism capable of providing the desired motion. Suitable controls for effectuating such coordinated motion will be well know to those skilled in the art.

With continued reference to FIGS. 5 and 6, an individual end separator 15 is first fabricated by removing a length of continuous separator material equal to the height of said end separator from coil 24, which has been positioned on uncoiler 29, by means of stock feeder 43 which pushes the desired length of material onto a cutting table 44 which is an integral part of the end separator fabrication station 34. The porous separator material indexed onto said cutting table is held firmly in position by a pick-up head 45 and simultaneously acted upon by a cutting means which severs the continuous length to form said individual end separator. A preferred cutting means, illustrated in FIG. 6, consists of a mobile shear blade 46 positioned in a slot 47, located between the cutting table 44 and the stock feeder 43, which severs the continuous separator material with an upward motion while said separator material is being held securely in place by said pick-up head and said stock feeder 43. The height of the individual end separator 15 is controlled by the length of continuous separator material indexed onto the cutting table 44 and the width of said separator is equal to the width of the continuous separator material removed from coil 24.

Once severed, the individual end separator 15 is lifted by the pick-up head 45, which is connected to a vacuum means (not shown) through a channel 45A contained therein, transported (dotted lines) to a position directly above the cell assembly enclosure 41 in the mobile cell assembly chamber 38 which has been indexed into position adjacent to the end separator fabrication station 34, and placed therein by a downward motion of said pick-up head and removal of the vacuum from channel 45A. The vacuum line may next be slightly pressurized with air to assist with removal of the end separator from the pick-up head. The pick-up head 45 is then retracted in an upward direction, transported to a position directly above the cutting table 44 and moved vertically downward until it is securely in contact with the next segment of the continuous separator material which has been indexed onto the cutting table from coil 24, and the mobile cell assembly chamber 38 is indexed to a position adjacent to the first polarity plate fabrication station 35. The above cycle is repeated when the mobile cell assembly chamber 38 is next indexed into position adjacent to the end separator fabrication station 34. The vertical and lateral movements shown in phantom as 45' and 45B' of the pick-up head 45 may be achieved by means of air-actuated cylinders 45B, 45C (FIG. 6), or mechanical means such as a cam-activated drive. The stock feeder means 43 may be of a reciprocating type, such as that shown in FIG. 5, a roll-actuated type, a tractor-activated type, or any other type which can be used to consistently deliver a specified length of separator material onto the cutting table 44.

Figure 7:
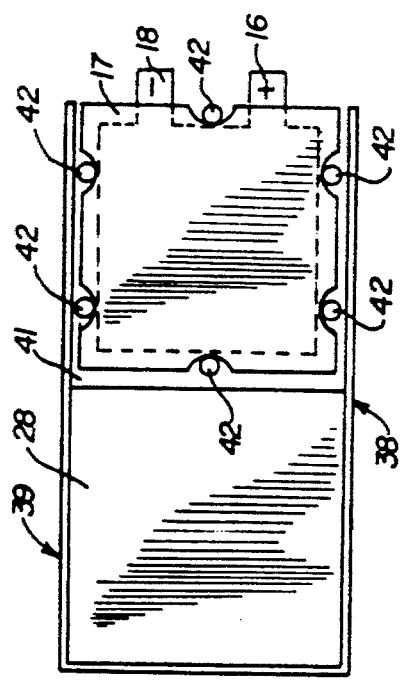
FIG. 7 is a plan view of a portion of the battery manufacturing apparatus with plates and separators in position.

If end separator 15 is sized to overlap the positive and negative plates in the cell assembly, the length and width dimensions of said separators are greater than the distances between the retractable alignment pins 42 in the cell assembly enclosure 41 such that, when the separators are placed into said enclosure, portions of said separators are temporarily deformed in the vicinity of each locating pin 42 as illustrated in FIG. 7. The positive and negative plates are shown underlying separator 21.

The second step in the cell assembly process involves the fabrication of a battery plate of a first polarity from a continuous length of electrochemically formed battery plate stock, transport of said battery plate to mobile cell assembly chamber 38, and insertion of said battery plate into said cell assembly chamber.

With reference to FIGS. 1, 2A, 3, 5, and 8, an individual battery plate 9 is fabricated by indexing a continuous length of electrochemically formed battery plate stock 1 of a first polarity, which may be in the form of a coil 25, through a lug cleaning station 49 (FIG. 8) in which the lug strip portion 5 of said battery plate stock is cleaned to remove loose dried battery paste and residual oxides. Such paste and residual oxides are created during the preceding curing and electrochemical formation processes. A specified length of said battery plate stock equal to the width of the individual battery plate 9 of first polarity to be fabricated is transported onto cutting table 50 by means of stock feeder 51. It is preferred that said continuous length of battery plate stock be oriented vertically as it traverses the lug cleaning station 49 and that the cleaned plate stock exiting the lug cleaning station be reoriented prior to entering the stock feeder 51 (FIG. 5) such that the major pasted surfaces of the plate stock indexed onto the cutting table 50 are positioned parallel to the surface of said cutting table.

The indexed length of battery plate stock is next acted upon by a cutting means which severs said individual battery plate from said continuous length such that said battery plate is comprised of a pasted portion 12 and an accurately positioned lug portion 10. A preferred cutting means is comprised of a mobile cutting die 52, which may be shaped as indicated by the broken lines in FIGS. 2 or FIG. 2A, positioned in a slot of generally similar shape 53 located in the cutting table 50. In this instance the cutting die severs the continuous plate stock with an upward motion while said plate stock is being held securely in place on the cutting table 50 by pick-up head 54 (FIG. 8) which contains a circumferential retractable portion 54A opposed to the cutting die.

A second preferred cutting means, illustrated in FIG. 9, is comprised of a rigid cutting die 55 mounted circumferentially relative to pick-up head 54 and adapted to reciprocate in the direction shown by the arrows and opposed to the surface of the cutting table 50 which severs the continuous plate stock 1 with a downward motion when said cutting die and said pick-up head are brought into contact with said plate stock. In this configuration, the pick-up head 54 is equipped with a means which permits an independent vertical motion relative to the rigid cutting die 55.

Once severed, the individual battery plate of first polarity is lifted by the pick-up head 54, which is connected to a vacuum means (not shown) through channel 56 contained therein and transported laterally to a position directly above the cell assembly enclosure 41 in the cell assembly chamber 38 which has been indexed into a position adjacent to the first polarity plate fabrication station 35 (FIG. 5). The pick-up head 54 is next rotated 90 degrees by a rotation means (not shown) such that the battery plate lug is oriented towards the cutting table 50 and said individual battery plate is placed into said cell assembly enclosure by a downward motion of said pick-up head and removal of the vacuum from channel 56. The vacuum line may be slightly pressurized to assist removal of the battery plate from the pick-up head. Precise positioning of said individual battery plate is achieved by means of battery plate alignment pins 42, as illustrated in FIG. 7.

The pick-up head 54 is next retracted in an upward direction and transported to a position directly above the cutting table 50 and the mobile cell assembly chamber 38 is indexed to a position adjacent to the intermediate separator fabrication station 36, and the above cycle may be repeated when the mobile cell assembly chamber 38 is next indexed into position adjacent to the first polarity plate fabrication station 35.

The vertical and lateral movements of the pick-up head 54 and circumferentially retractable portion 54A, may be achieved by means of air-actuated cylinders 45D, 45E, 45F and 45G or mechanical means such as a cam-activated drive. The stock feeder means may be of a reciprocating type, as illustrated in FIG. 5, a roll-type, a tractor-feed type, or any other type which can be used to consistently deliver a specified length of continuous battery plate stock onto the cutting table 50. The first polarity plate fabrication station 35 also contains a means for removal of scrap generated during the plate severing operation (not shown).

The third step in the cell assembly process, which involves fabrication of an individual intermediate separator from a continuous length of intermediate battery separator stock and insertion of said individual intermediate separator into cell assembly chamber, is essentially the same as that heretofore described pertaining to the fabrication, transport, and insertion of the individual end separator.

In general, the subsequent cycles of operating will be generally identical to the previously described procedures with respect to the separator and battery plate stock handling and, as a result, will not be described in detail.

With reference to FIGS. 3, 5 and 6, an individual intermediate battery separator 17 is fabricated by removing a length of continuous separator material equal to the height of said intermediate separator from coil 26, which has been positioned on uncoiler 30, by means of stock feeder 57 which pushes the desired length of material onto a cutting table 58 which is an integral part of the intermediate separator fabrication station 36. With reference to FIG. 6, the porous separator material indexed onto said cutting table is held firmly in position by a pick-up head identical to pick-up head 45 and simultaneously acted upon by a cutting means which severs the continuous length to form the individual intermediate separator 17 (see FIG. 2). A preferred cutting means consists of a mobile shear blade such as a blade identical to blade 46 positioned in a slot, located between the cutting table 58 and the stock feeder 57. The blade severs the continuous separator material with an upward motion while said separator material is being held securely in place by said pick-up head and said stock feeder. The height of the individual intermediate separator 17 is controlled by the length of continuous separator material indexed onto the cutting table 58 and the width of said separator is equal to the width of the continuous separator material removed from coil 26.

Once severed, the individual intermediate separator 17 is lifted by the pick-up head which is connected to a vacuum means through a channel contained therein, transported laterally to a position directly above the cell assembly enclosure 41 in the mobile cell assembly chamber 38 which has been indexed into position adjacent to the intermediate separator fabrication station 36, and placed therein by a downward motion of said pick-up head and removal of the vacuum from the channel. The vacuum line may next be slightly pressurized with air to assist removal of the intermediate separator from the pick-up head. The pick-up head is then retracted in an upward direction, transported laterally to a position directly above the cutting table 58 and moved vertically downward until it is securely in contact with the next segment of the continuous separator material which has been indexed onto the cutting table from coil 26, and the mobile cell assembly chamber 38 is indexed to a position adjacent to the second polarity plate fabrication station 37. The above cycle may be repeated when the mobile cell assembly chamber 38 is next indexed into position adjacent to the intermediate separator fabrication station 36. The vertical and lateral movement of the pick-up head may be achieved by means of air-actuated cylinders or mechanical means such as a cam-activated drive. The stock feeder means 57 may be of a reciprocating type, as illustrated in FIG. 5, a roll-actuated type, a tractor-actuated type, or any other type which can be used to consistently deliver a specified length of separator material onto the cutting table 58.

If end separator 15 and intermediate separator 17 are sized to overlap the positive and negative plates in the cell assembly, the length and width dimensions of said separators are greater than the distances between the retractable plate alignment pins 42 in the cell assembly enclosure 41 such that, when the separators are placed into said enclosure, portions of said separators are temporarily deformed in the vicinity of each locating pin, as shown in FIG. 7.

The fourth step in the cell assembly process, which involves the fabrication of an individual battery plate of a second polarity from a continuous length of electrochemically formed battery plate stock, transport of said battery plate to mobile cell assembly chamber 38, and insertion of said battery plate into said cell assembly chamber, is essentially the same as that heretofore described pertaining to the fabrication, transport, and insertion of the individual battery plate of a first polarity.

With reference to FIGS. 1, 2A, 5 and 8, an individual battery plate 9 of a second polarity is fabricated by indexing a continuous length of electrochemically formed battery plate stock 1, which may be in the form of a coil 27, through a lug cleaning station such as 61 in which the lug strip portion 5 of said battery plate stock is cleaned to remove loose dried battery paste and residual oxides created during the preceding curing and electrochemical formation processes, and transporting a specified length of said battery plate stock equal to the width of the individual battery plate of a second polarity to be fabricated onto cutting table 62 (FIG. 5) by means of stock feeder 63. It is preferred that the continuous length of battery plate stock be oriented vertically as it traverses the lug cleaning station and that the cleaned plate stock exiting said lug cleaning station be reoriented prior to entering the stock feeder 63 such that the major pasted surfaces of the plate stock indexed onto the cutting table 62 are positioned parallel to the surface of said cutting table.

The indexed length of battery plate stock is next acted upon by a cutting means which severs said individual battery plate from said continuous length such that said battery plate is comprised of a pasted portion 12 and an accurately positioned lug portion 10 positioned such that, when said battery plate is placed into the mobile cell assembly chamber 38, all of the lugs of the second polarity are properly aligned and situated relative to the aligned lugs of the first polarity such that formation of the individual plate straps connecting lugs of common polarity can be formed without further movement of said plate lugs.

Figure 8:
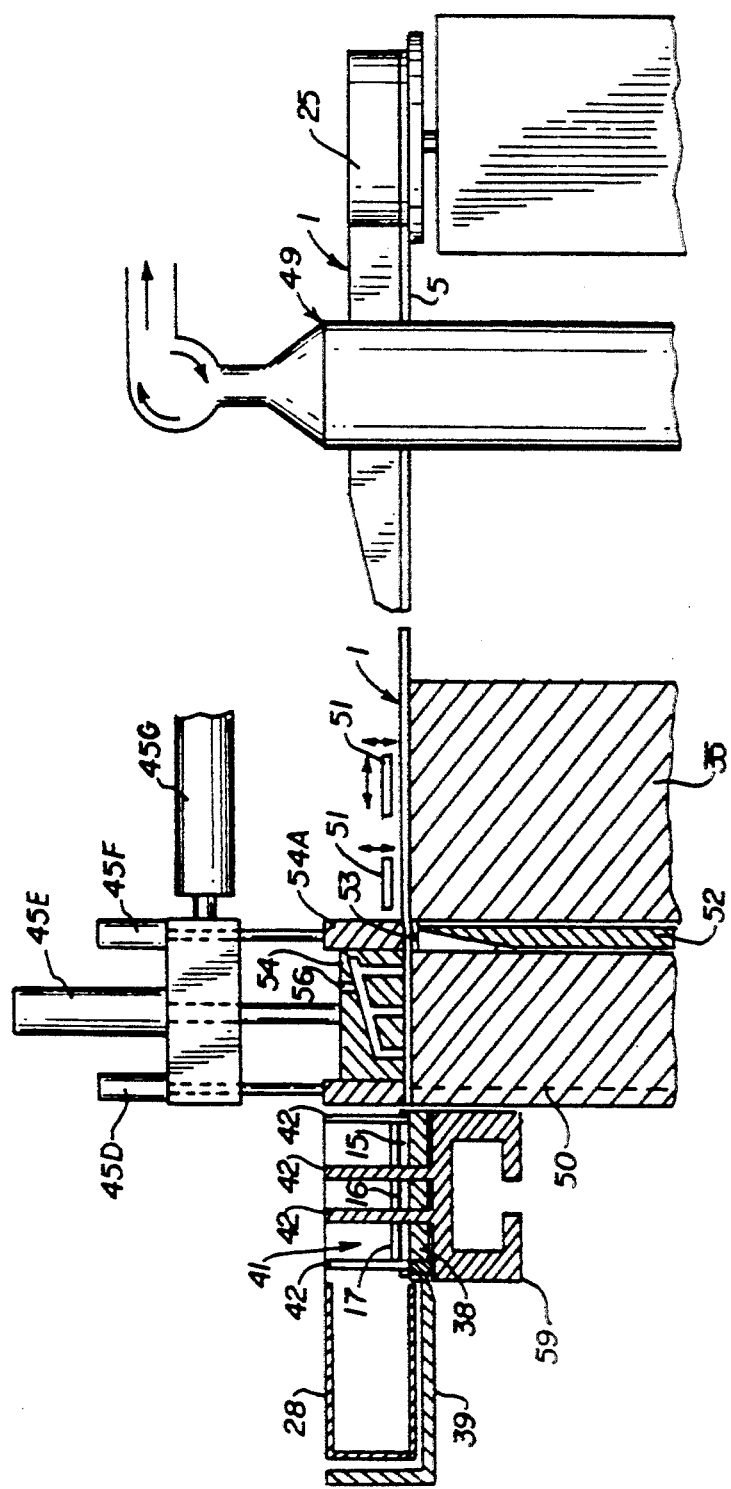
FIG. 8 is a partially schematic illustration of a plate forming portion of the battery manufacturing apparatus of FIG. 5.

A preferred cutting means is generally identical to that of the type shown in FIG. 8 and has a mobile cutting die 64 (FIG. 5), which may be similar to mobile cutting die 52 (FIG. 8) and may be shaped as indicated by the broken lines in FIGS. 2 or FIG. 2A, positioned in a slot 65 (FIG. 5), of similar shape located in the cutting table. In this instance the cutting die severs the continuous plate stock with an upward motion while said plate stock is being held securely in place on the cutting table by pick-up head which may be identical to pick-up head 54 (FIG. 8) which contains a circumferential retractable portion which may be identical to retractable portion 54A (FIG. 8) opposed to said cutting die. A second preferred cutting means which may be identical to that shown in FIG. 9, is comprised of a cutting die which may be identical to cutting die 55 mounted circumferentially relative to pick-up head which may be identical to pick-up head 54 and opposed to the surface of the cutting table 62 which severs the continuous plate stock with a downward motion when said cutting die and said pick-up head are brought into contact with said plate stock. In this configuration, the pick-up head is equipped with a means that permits an independent vertical motion relative to the rigid cutting die.

Once severed, the individual battery plate 9 of a second polarity is lifted by the pick-up head, which is connected to a vacuum means and transported laterally to a position directly above the cell assembly enclosure 41 in the cell assembly chamber 38 which has been indexed into a position adjacent to the second polarity plate fabrication station 37. The pick-up head is next rotated 90 degrees by a rotation means (not shown) such that battery plate lug 10 is oriented towards the cutting table 62 and said individual battery plate is placed into said cell assembly enclosure by a downward motion of said pick-up head and removal of the vacuum. The vacuum line may be slightly pressurized with air to assist removal of the battery plate from the pick-up head. Precise positioning of said individual battery plate is achieved by means of battery plate alignment pins 42, as illustrated in FIG. 7.

The pick-up head is next retracted in an upward direction, returned to a position directly above the cutting table 62, and the mobile cell assembly chamber 38 is indexed to a position adjacent to the intermediate separator fabrication station 36 or end separator fabrication station 34 depending upon the specific cell construction derived. The above cycle may be repeated when the mobile cell assembly chamber 38 is next indexed into position adjacent to the second polarity plate fabrication station 37.

The vertical and lateral movements of the pick-up head may be achieved by means of air-actuated cylinders or mechanical means as is well known to those skilled in the art. The stock feeder means may be of a reciprocating type such as is illustrated in FIG. 5, a roll-type, a tractor-feed type, or any other type which can be used to consistently deliver a specified length of continuous battery plate stock onto the cutting table. The second polarity plate station 37 also contains a means for removing any scrap generated during the plate severing operation.

The hereinabove described sequence of fabricating, transporting individual intermediate separators, individual plates of a first polarity, individual plates of a second polarity, and an individual end separator is repeated until a completed cell assembly consisting of any desired number of alternating plates of a first polarity and plates of a second polarity separated by intermediate separators and two end separators has been obtained.

Figure 10:
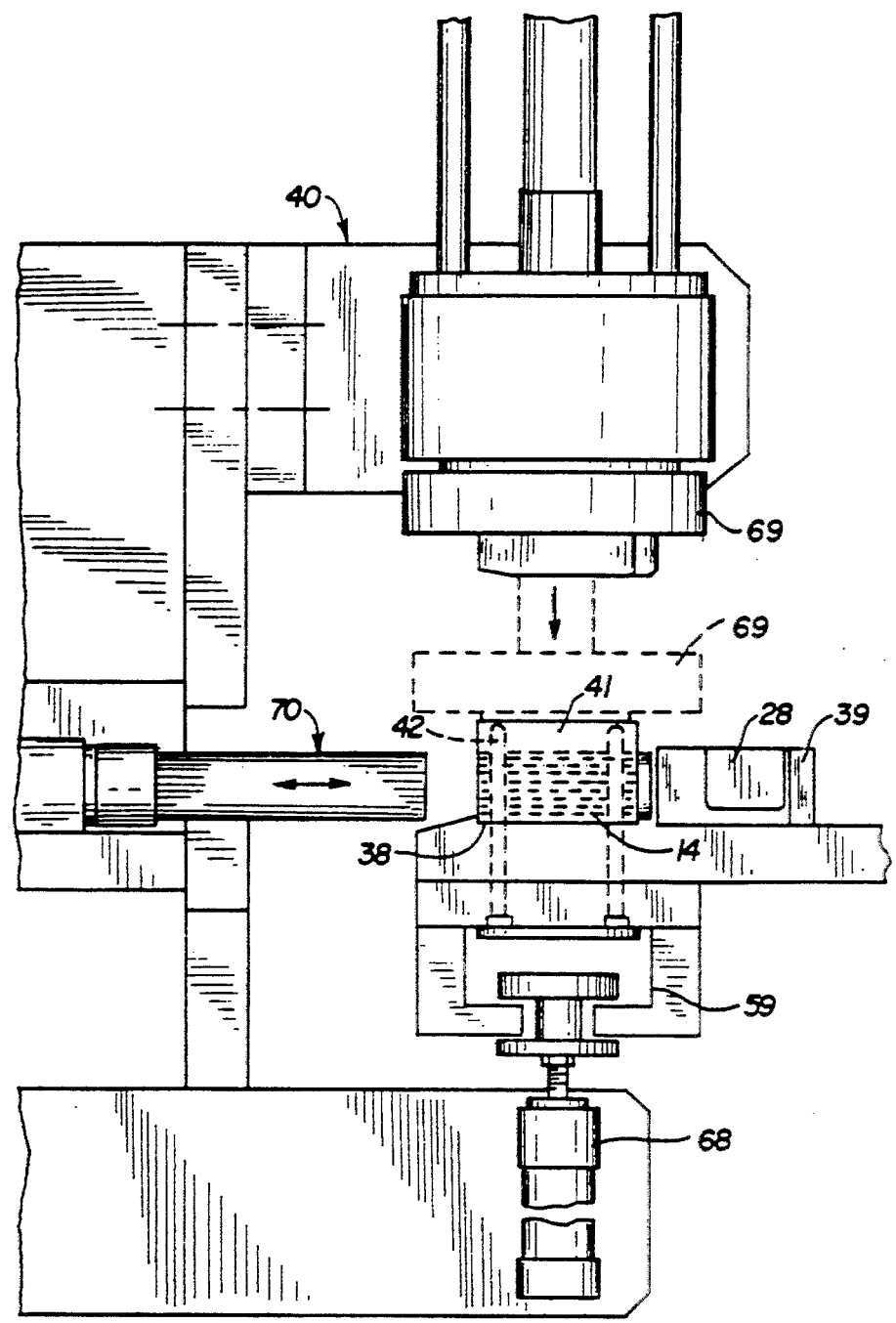
FIG. 10 is a partially schematic illustration of the cell insertion portion of the apparatus of FIG. 5.

Upon completion of the aforesaid sequence, the cell assembly chamber 38 (FIGS. 5, 6 and 10) is indexed adjacent to the cell insertion station 40. With reference to FIG. 10, the completed cell assembly is acted upon in a downwardly direction by a compression means 69 such that the compressed cell assembly 14 is aligned with the top opening of the battery container 28 which is disposed in the battery container support section 39 of mobile cell assembly chamber 38. The length and width of said compressed cell assembly are less than the equivalent length and width dimensions of the top opening of said battery container. The battery plate alignment pins 42 are retracted by a pin retraction means 59 such as an air-actuated cylinder 68. The compressed cell assembly is next acted upon in a horizontal direction by a reciprocating insertion means 70 which slides said cell assembly laterally relative to compression means 69 and inserts said cell assembly into the battery container 28. Compression means 69 and cell insertion means 70 are next retracted, the battery container and the cell assembly therein are removed from the mobile cell assembly chamber 38, a new container is inserted into the battery container support means 39, and the cycle is repeated.

Although a single cell battery container 28 has been used in the above illustration, it will be obvious to those skilled in the art that the method of this invention may also be used to fill multi-cell battery containers by mounting the battery container support means 39 upon a vertical indexing means which sequentially positions said multi-cell battery container such that the partitioned volume into which the cell assembly is to be inserted is properly aligned with the cell assembly enclosure 41.

The sequence and speed of all of the operations involved in the method of battery cell assembly heretofore described may be controlled by any suitable means such as a programmable controller such as Model SLC-100 produced by the Allan Bradley Company.

As illustrated in FIG. 4, which shows a cell assembly partially inserted into a battery container, the aforesaid procedure results in a compressed cell in which all plate lugs of a first polarity and all plate lugs of the opposite polarity are aligned such that the assembled cell can be subjected to a subsequent plate strap formation step without further positioning of the plates within said assembly.

In yet another embodiment of this invention, the number of steps and time involved in building a complete battery cell assembly is greatly reduced by simultaneously processing a continuous length of porous separator material and a continuous length of electrochemically formed battery plate stock.

Referring to FIG. 11, this embodiment involves:

(a) Indexing a length of continuous porous battery separator stock 24 into end separator station 34 and severing and transporting the same. The separator is inserted into the mobile cell assembly chamber 38, using the methods heretofore described for end separators and intermediate separators. The mobile cell assembly chamber is indexed to a position adjacent to the first polarity plate fabrication station 35 by means of air cylinder 38B; and (b) Aligning a second continuous length of porous battery separator stock 26 vertically above and in contact with a continuous length of electrochemically formed battery plate stock of a first polarity 25 such that said separator stock overlaps both longitudinal edges of said battery plate stock to the degree desired; and (c) Simultaneously indexing equal lengths of the aforesaid second separator stock and battery plate stock onto cutting table 50 of the first polarity plate fabrication station 35 and simultaneously severing, transporting, and inserting the separator and battery plate thus formed into the mobile cell assembly chamber 38, using the methods heretofore described for processing battery plates of both polarities, and indexing said mobile cell assembly chamber to a position adjacent to the second polarity plate fabrication station 37; and (d) As shown in FIGS. 11 and 11A, aligning a third continuous length of porous battery separator stock 72 vertically above a continuous length of electrochemically formed battery plate stock of a second polarity 27 such that said separator stock overlaps both longitudinal edges of said battery plate stock to the degree desired; and (e) Simultaneously indexing equal lengths of the aforesaid third separator stock and second polarity battery plate stock onto cutting table 62 of second polarity plate fabrication station 37 and simultaneously severing, transporting, and inserting the separator and battery plate thus formed into the mobile cell assembly chamber 38, using the methods heretofore described for processing battery plates of both polarities, and indexing the mobile cell assembly chamber to first polarity plate fabrication station 50 (or to cell insertion station 40 if the cell assembly being produced only contains two plates of opposite polarity); and (f) Sequentially repeating steps 4 and 5 until the desired number of alternating plates of first and second polarity each separated by a porous separator have been placed in the aforesaid mobile cell assembly chamber; and (g) Indexing said mobile cell assembly chamber to the cell insertion station 40 in which the cell assembly is compressed and inserted into cell container 28 as heretofore described.

The use of this embodiment greatly increases the speed of assembly by combining two processing steps into a single step in which one separator and one plate are processed simultaneously.

Cell assemblies produced using this second embodiment are characterized by plates and separators of identical width such that the side edges of said separators and said battery plates are flush with one another. In order for the separators to overlap the top border of the plates to a desired degree, it is necessary to pre-punch the lug portion of the plate in lug punch stations 71 and 73 (FIG. 11) and to sever the battery plate and separator combination from the continuous lengths of plate stock and separator stock by means of a sole transverse cut across the entire width of said plate stock and separator stock in plate fabrication stations 35, 37. The distance by which each separator overlaps each plate on the bottom edge is controlled by the relative widths and alignment of the plate stock and separator stock that are indexed into said plate fabrication stations.

In yet a third embodiment of this invention, the advantages of the automated method of manufacturing cells described in the first embodiment hereof may also be achieved in the assembly of cells containing cured or electrochemically formed plates produced by means other than severing from continuous lengths of electrochemically formed battery plate stock in situ during the assembly operation. For example, plates produced by severing individual plates from panels containing two or more such plates, plates produced by severing individual plates from a continuous length of battery plate stock prior to introduction of the severed plates into the cell assembly means, or plates that are pasted and cured and, optionally, electrochemically formed as a singular plate.

Figure 13:
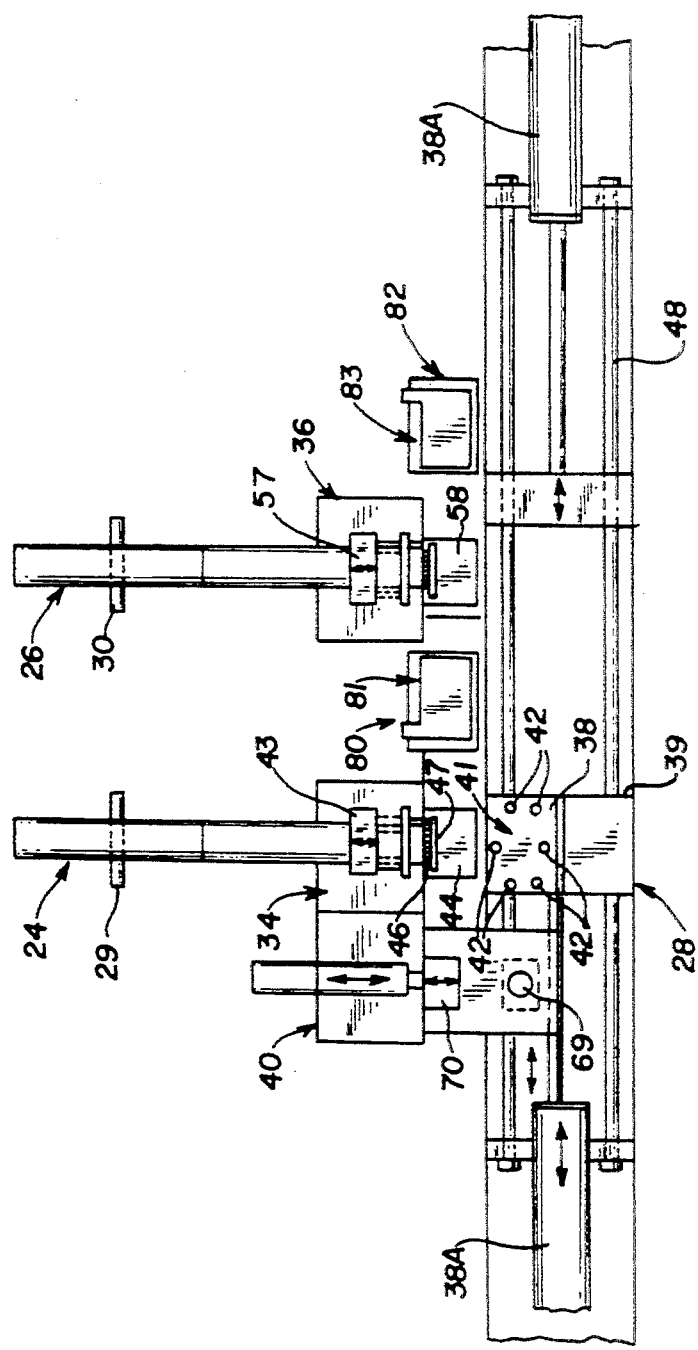
FIG. 13 is a schematic plan illustration of a modified form of the system illustrated in FIG. 5.

The practice of this embodiment will be discussed with emphasis on the changes to FIG. 5 shown in FIG. 13. Cell assembly means 33 is altered such that the first polarity plate fabrication station 35 and the second polarity plate fabrication station 37 and uncoiling means 31 and 32, lug cleaning stations 49 and 61, stock feeders 51 and 63, cutting tables 50 and 62 containing slots 53 and 65, respectively, and mobile cutting dies 52 and 64, associated therewith, all shown in FIG. 5, are eliminated from the assembly FIG. 13. They are replaced by a plate containment and conveyor means of the type illustrated in FIG. 13, in which two or more plates of singular polarity are positioned vertically such that, with the exception of the uppermost plate and lowermost plate in the vertical stack, the horizontal pasted surfaces of each plate are each in intimate contact with a horizontal pasted surface of each adjacent plate in said vertical stack. The plate lugs of all plates in the plate containment and conveyor means are accurately aligned. The plate containment and conveyor means is precisely located in relation to the pick-up head of a type described previously herein which removes the uppermost plate from the stack and transports it to the cell assembly chamber.

Figure 14:
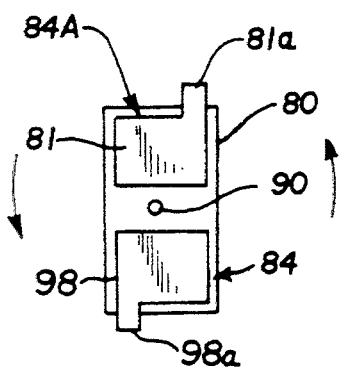
FIG. 14 is a top plan view of a form of plate containment and conveyor means of the embodiment of FIG. 3.
Figure 16:
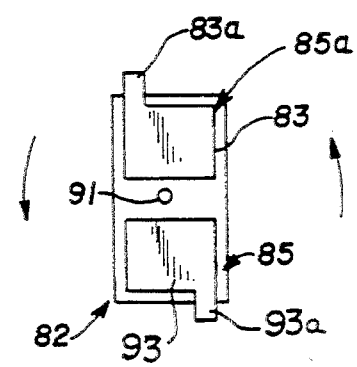
FIG. 16 is a top plan view of a form of plate containment and conveyor means of the embodiment of FIG. 13.
Figure 15:
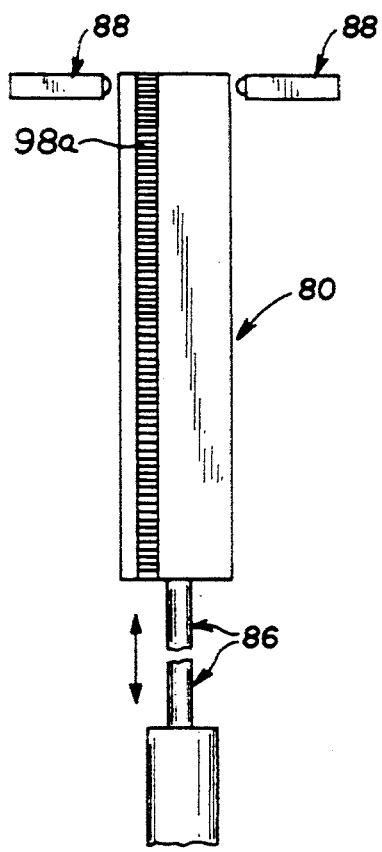
FIG. 15 is a front elevation of the containment and conveyor means of FIG. 24.
Figure 17:
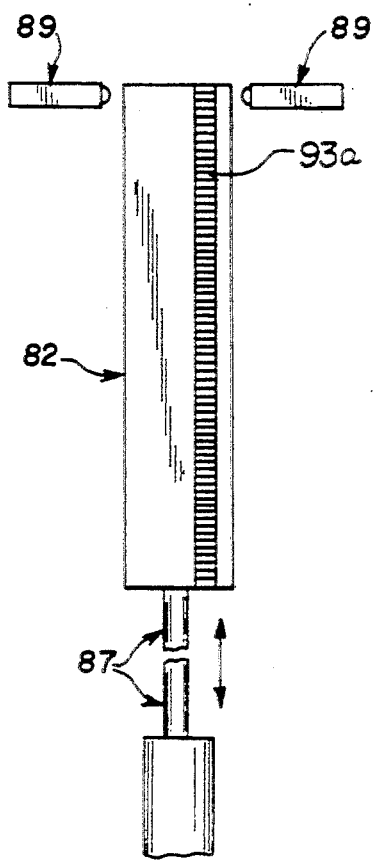
FIG. 17 is a front elevation of the containment and conveyor means of FIG. 16.

Referring to FIGS. 13 through 17, the upwardly open plate containment and conveyor means 80 for storing and sequentially dispensing plates 81, 98 of a first polarity having respectively tabs 81*a*, 98*a* in chambers or magazines 84, 84A shown in FIG. 14, and the plate containment and conveyor means 82 for storing and sequentially dispensing plates 83, 93 of a second polarity having tabs 83*a*, 93*a* in chambers or magazines 85, 85A shown in FIG. 16. The chambers or magazines 84, 84A, 85, 85A preferably have sidewalls which are substantially continuous except for the slots which receive tabs 81*a*, 98*a*, 83*a*, 93*a*. Tabs 81*a*, 98*a*, 83*a*, 93*a* are each aligned with like numbered tabs. Plates of the proper polarity are stacked such that the bottom horizontal surface of the lowest plate in each stack is in contact with a support plate (not shown) in its chamber. The movable support plates are disposed and configured such that they move freely in a vertical direction within chambers 84, 84A, 85, 85A, but cannot be retracted from said chamber in a downward direction. The support plate of a stack of plates being supplied to the pick-up head is normally in overlying supported contact with a vertical post 86, 87 which intermittently conveys plates 81, 98, 83, 93 vertically upwardly a predetermined distance until the upper horizontal surface of the uppermost plate reaches a precise vertical position relative to pick-up head (not shown) of the type described previously herein. The precise vertical position of the uppermost plate may, for example, be controlled by sensing means 88, 89 which, upon sensing the desired vertical location of said uppermost plate, acts to terminate the vertical motion of vertically acting member post 86, 87, thereby placing the plate in a precisely desired location for pick-up and transport by the pick-up head. Upon removal of the uppermost plate by the pick-up head, sensing means 88, 89 causes vertically oriented post 86, 87 to move the stack of remaining plates vertically upwards in chamber 84, 85 until the upper horizontal surface of the then uppermost plate is again properly positioned relative to sensing means 88, 89 and the pick-up head.

The sensor means 88, 89 may conveniently be optical beam systems wherein partial or total obstruction of the beam by a plate will cause the light receiver to emit an electrical signal indicating that the uppermost plate is in the desired position. The pick-up head will then remove the uppermost plate at which time the light receiver will receive the light beam indicative of the need to elevate the plate stack. The receiver may issue an electrical signal to a controller which may cause a stepping motor to elevate the vertical post and the plate stack until the sensor means indicating that the uppermost plate has reached the desired position. When the stack of plates has been exhausted the vertically oriented posts are lowered to the lowest position and the empty magazine may be refilled.

In the form shown, magazines 84, 84A have two stacks of plates 81, 98. One stack 81 may be employed as a supply stack while the other stack 98 is refilled. After exhaustion of the supply stack, the magazines 84, 84A are rotated about pivot 90 by any suitable means 180 degrees. This places the newly filled stack under the pick-up head and permits the other stack to be replenished. The magazines 84, 84A each have stack supports (not shown) positioned under each stack of plates 81, 98. The upper portion of post 86 directly or indirectly engages the underside of the support or through a downwardly open tubular member secured thereto, for example. The post 86 is lowered prior to magazine rotation in order to disengage the upper end of post 86 from the support. After rotation of the magazine 84, 84A, the post 86 engages the other support to elevate the stack of plates 81, 98. Similarly, magazines 85, 85A rotate about pivot 91 to position plate stacks 83, 93 in the desired positions for supply and refilling. Post 87 engages the support plates that underlies the supply stack of plates.

Vertical posts 86, 87, are capable of being totally withdrawn in a downward direction from chambers 84, 84A, 85, 85B. In addition, to the example given they may be driven by an air cylinder, a hydraulic cylinder, an electrical servomechanism, a cam operated device, or by any other means suitable for achieving the desired intermittent vertical motion and accurate control of the vertical position of the plates 81, 83, 93, 98 to move relative to vertically oriented posts 86, 87.

Plate containment and conveyor means 80, 82 may consist of a single magazine 84, 85, two magazines 84, 84A, 85, 85A each having one stack of plates, or a multiplicity of magazines. The stacks of individual plates may be placed into one or more magazines simultaneously with plates being removed automatically from one or more other magazines, thereby allowing the assembly process to proceed uninterrupted by the addition of plates to the plate containment and conveyor means 80, 82.

In order to assure continuous uninterrupted plate assembly, plate containment and conveyor means 80, 82, the sensor means 88, 89 or other suitable means sense when the lowest plate in the stack is removed from chamber 84, 85 respectively, and sequentially causes (a) vertically oriented posts 86, 87, to be withdrawn vertically downward until they exit from the empty chamber, (b) upwardly open plate containment and conveyor means 80, 82 to move relative to posts 86, 87 and the pick-up head such that the empty magazine is removed from alignment with the vertical posts 86, 87 and the pick-up head and a second magazine containing additional battery plates 81, 83, 93, 98 is positioned in proper alignment with said vertically acting member and the pick-up head and (c) vertically oriented posts 86, 87 are then caused to move vertically upwards until they enter the newly positioned chamber 84, 84A, 85, 85A supportingly engaging the support plate therein and raise the uppermost plate in the plate stack to the desired vertical position relative to pick-up head. Movement of plate containment and conveyor means 80, 82 may be rotational around a vertical axis 90, 91, as illustrated in FIGS. 14 and 16, or laterally, if desired. Such movement may be achieved by any desired means such as by the use of air cylinders or hydraulic cylinders, servomechanisms, cam operated drives, or any other suitable means of achieving the desired movement. In the form illustrated, posts 86, 87 do not rotate or move apart from the described vertical movement. In the alternative multiple posts, one for each magazine of the multiple magazine may be employed.

In summary with reference to FIG. 13 through 17 this embodiment preferably involves:

1. Indexing a length of continuous porous battery separator stock 24 into end separator station 34 and severing and transporting the individual separator. The separator is then inserted into the mobile cell assembly chamber 38, using the methods hereinbefore described for end separators and intermediate separators. The mobile cell assembly chamber 38 is then indexed to a position adjacent to the first polarity plate containment and conveyor means 80 by means of air cylinder 38A; and 2. Removing the uppermost battery plate from a stack of battery plates of first polarity 81 from battery plate containment and conveyor means 80 and directly transporting said battery plate of first polarity to mobile cell assembly chamber 38 and inserting said plate therein using methods heretofore described for conveying and inserting plates of both polarities. The mobile cell assembly chamber 38 is then indexed to a position adjacent to intermediate separator station 36; and 3. Indexing a second length of continuous porous battery separator stock 26 into intermediate separator station 36 and severing and transporting the same to mobile cell assembly chamber 38 and inserting said severed separator therein using methods heretofore described for transporting and inserting end separators and intermediate separators. The mobile cell assembly chamber 38 is then indexed to a position adjacent to the second polarity plate containment and conveyor means 82; and 4. Removing the uppermost battery plate from a stack of battery plates of second polarity 83 from battery plate containment and conveyor means 82 and directly transporting said battery plate of second polarity to mobile cell assembly chamber 38 and inserting said plate therein using methods heretofore described for conveying and inserting battery plates of both polarities. The mobile cell assembly chamber 38 is then indexed to intermediate separator station 36 and steps #3 and #2 followed by steps #3 and #4 are then sequentially repeated until the desired number of plates of first and second polarity each separated by a porous separator have been placed in the aforesaid mobile cell assembly chamber; and 5. Indexing the mobile cell assembly chamber 38 to a position adjacent to end separator station 34 and repeating step #1; and 6. Indexing said mobile cell assembly chamber 38 to cell insertion station 40 in which the cell assembly is compressed and inserted into cell container 28 as heretofore described.

It will be appreciated that the use of this third embodiment greatly increases the speed and degree of automation with which battery plates that are produced prior to being introduced into a cell assembly means can be assembled into cells and inserted into a battery container. In this embodiment, a combination of the severance of separators from continuous separator stock and the chamber supplied plates provide for rapid production.

In a fourth embodiment of this invention, individual porous separators pre-cut to the desired dimensions at a location external to the cell assembly means and introduced into the cell assembly means in a vertical stack, may be substituted for the end and intermediate separators heretofore described. In this embodiment, end separator station 34 and intermediate separator station 35 are each replaced by a separator containment and conveyor means similar in construction and operation to plate containment and conveyor means 80, 82 as hereinbefore described. Removing the uppermost separator from a stack of pre-cut separators positioned in the separator containment and conveyor means, directly transporting said pre-cut separator to the mobile cell assembly means, and inserting said separator therein, is achieved by using methods previously described herein for the removal, transport, and insertion of battery plates of both polarities.

While the hereinabove discussion and illustrations of the method of this invention have been restricted to an apparatus having only a single end separator fabrication station, a single positive plate fabrication or plate containment station, a single intermediate separator fabrication station, a single negative plate fabrication or plate containment station, and a single reciprocating cell assembly chamber, it will be apparent to those skilled in the art that one may practice the invention using an apparatus containing a plurality of cell assembly chambers which move in a reciprocating manner as heretofore described relative to a plurality of separator fabrication stations and positive and negative plate fabrication or containment stations or which move in only one direction relative to a plurality of end separator fabrication stations, positive plate fabrication stations, intermediate separator fabrication stations, and negative plate fabrication stations, the number of each of said stations being equal to the number of end separators, positive plates, intermediate separators, and negative plates, respectively, contained in the finished cell assembly. The aforesaid plurality of cell assembly chambers may be indexed in a rotary manner or in a straight line manner past a series of adjacent separator and plate fabrication stations.

While for convenience the above discussion and illustrations have made reference to specific configurations, polarities, and assembly steps, it will be apparent to those skilled in the art that one may practice the invention employing other configurations, relative polarities and plate positions, and assembly conditions. Also, if desired, the invention may be practiced without the use of end separators in the cell assembly.

The following example provides specific preferred practices in employing the methods of this invention.

EXAMPLE

This example illustrates that lead-acid battery cell assemblies can be produced automatically by means of the method of this invention and that batteries made therefrom are equivalent in capacity and performance to similar batteries assembled by hand.

Seventy-three lead-acid battery cell assemblies were produced using an automated cell assembly apparatus having of an end separator fabrication station, a positive plate fabrication station, an intermediate separator fabrication station, a negative plate fabrication station, a cell insertion station, and a reciprocating mobile cell assembly chamber containing an integral battery container support section. The stations and cell assembly chamber were positioned relative to one another as illustrated in FIG. 5.

Each cell assembly consisted of two 2.10"L×1.41"H×0.078" porous microfiber glass mat end separators; four 1.79"L×1.26"H×0.087"T positive plates, six 2.10"L×1.41"H×0.086"T porous microfiber glass mat intermediate separators, and three 1.79"L×1.26"H×0.077"T negative plates. Each positive plate and each negative plate contained a 0.188"L×0.100"W and 0.035"T lug portion protruding outwards from the top border portion thereof. Each positive plate contained approximately 8.5 grams of electrochemically formed positive active material. Each negative plate contained approximately 6.9 grams of electrochemically formed negative active material. Each completed cell assembly was inserted into a single cell polypropylene battery container such that approximately 25% of the height of the cell assembly protruded from the top of the container in order to facilitate formation of the positive and negative plate straps in a subsequent operation. The interior dimensions of the top opening of each battery container were approximately 1.97"×0.910, the interior depth was 1.56", the wall thickness was approximately 0.035", and each wall of the container had a draft angle of approximately 1'.

The end separator fabrication station and the intermediate separator fabrication station of the automated cell assembly apparatus were essentially the same as those described previously and illustrated in FIGS. 5 and 6. Each station included a cutting table, a reciprocating stock feeder, and upwardly acting shear blade, and a pickup/transport head positioned so as to be directly above the cutting table when in the retracted position and to be directly above the aforesaid mobile cell assembly chamber when in the extended position.

The positive and negative plate fabrication stations were modified from those previously described to accommodate pre-cut, pre-cleaned electrochemically formed battery plates which were used to simulate plates severed from continuous lengths of cleaned positive and negative plate stock. Each station contained a upwardly acting plate feeding magazine and a pickup/transport head positioned so as to be directly above said magazine when in the retracted position and directly above the aforesaid mobile cell assembly chamber when in the extended position.

In a separate experiment, it was determined that individual electrochemically formed positive and negative battery plates, each having a pre-formed top border and lug protruding outwardly therefrom, could be satisfactorily severed from a length of electrochemically formed battery plate stock containing five such plates, each measuring about 1.79"×1.26" and each containing a 0.188"×0.100"×0.035" lug. The positive plates were approximately 0.087" thick. The negative plates were approximately 0.077" thick. The hardened steel cutting tool employed to sever the plates was ground so as to have an included angle of 5' to 7' between the intersecting surfaces which formed the cutting edge of said tool.

Pre-cut electrochemically formed positive plates similar to those described hereinabove were placed into the positive plate feeding magazine and pre-cut, electrochemically formed negative plates similar to those described above were placed into a negative plate feeding magazine. The magazines were positioned in their respective stations such that an individual pre-cut plate was presented to the pick-up/transport head at precisely the same location and height as would have been the case if each plate had been severed from a continuous length of plate stock at that location. The lugs of all of the positive and negative plates had been pre-cleaned by wire brushing prior to insertion into said magazines. In order to simulate the lug orientation step described previously, all positive plates were placed in the positive magazine such that the plate lugs faced away from the mobile cell assembly chamber and were towards the left side of the magazine, whereas all negative plates were placed in the negative magazine such that the lugs faced away from the mobile cell assembly chamber and were towards the right side of the magazine. The operation of the plate fabrication stations involved removal of the topmost plate from a vertical stack of plates in the magazine and moving the remaining plates vertically upward until the top surface of the uppermost plate remaining in the magazine was positioned essentially in the same plane as was the top surface of the plate which had just been removed from the magazine. The upward motion of the plate stack in the magazine was provided by a commercially available air-over-oil cylinder. The height to which the plate stack was raised was controlled by an electric eye positioned so as to halt the upward motion of the cylinder when the topmost surface of the top plate in the magazine reached the desired level.

The vertical movement of each pick-up/transfer head in the cell assembly apparatus was imparted by means of commercially available air-activated cylinders, whereas the horizontal movement of said pick-up/transfer head was imparted by means of commercially available air-activated slides. All cylinders and slides were controlled by a series of solenoids and pneumatic valves. A vacuum created by the use of a single commercially available vacuum pump attached in series with a vacuum accumulator tank and applied to each pick-up/transport head imparted the force required to hold the component firmly to said pick-up head. Removal of the vacuum from the pick-up head allowed the plates and separators to be released once placed in the mobile cell assembly chamber. The mobile cell assembly chamber of the cell assembly apparatus was essentially the same as that previously described and contained a cell assembly section into which retractable plate alignment pins were inserted and a battery container support section which properly aligned a battery container therewith.

The battery container was placed in the container support section on its side such that the open top of the container faced said assembly section. The movement and proper positioning of the mobile assembly chamber relative to each fabrication station was provided by means of two commercially available 3-position air-activated cylinders, as shown in FIGS. 5 and 11. The first cylinder controlled both the movement of the mobile cell assembly chamber and its proper alignment with the cell insertion station, the end separator fabrication station, and the positive plate fabrication station. The second cylinder controlled alignment of the cell assembly chamber with the intermediate separator fabrication station and the negative plate fabrication station by accurately placing a positive stop at the desired station against which the cell assembly unit was positioned by movement of the first cylinder. The insertion of the retractable plate alignment pins into the cell assembly section and the retraction therefrom was accomplished by means of a commercially available air-actuated cylinder.

The cell insertion station of the automated cell assembly apparatus was essentially the same as that previously described and contained a downwardly moving compression member which compressed the completed cell assembly such that the compressed height of said assembly was less than 0.910", a downwardly moving pin retraction member which engaged the steel plate to which all of the retractable battery plate alignment pins were attached and pulled it downwards until all of the pins were retracted from the cell assembly section, and a forwardly moving insertion member which displaced the compressed cell assembly horizontally and caused it to be inserted into the battery container. The vertical motions of the compression member and the pin retraction member were imparted by means of commercially available air-activated cylinders. The horizontal motions of the insertion member were imparted by means of a commercially available air-activated slide device. All of the aforesaid air-activated devices were controlled by a series of solenoids and pneumatic valves.

The sequence and speed of all of the motions described above were controlled by a commercially available programmable controller.

The sequential steps followed in the automatic production of the aforesaid 73 lead-acid battery cell assemblies were, as follows:

(a) A single cell battery container was manually placed into the battery container support section of the mobile cell assembly chamber; and (b) The automatic cycle was begun by depressing the "Start" button on the automated cell assembly device, (Note: All steps described hereafter occurred automatically.); and (c) The mobile cell assembly chamber was indexed into position adjacent to the cell insertion station, the retractable battery plate alignment pins were inserted into the cell assembly section of said chamber, and the mobile cell assembly chamber was indexed into position adjacent to the end separator fabrication station; and (d) A 1.41" length of 2.10"W and 0.078"T porous microfiber glass mat end separator was indexed onto the cutting table of the end separator fabrication table; the pick-up/transport head was moved vertically downward to contact the separator and a vacuum was applied to said head; the separator was cut to length by the upward movement of the shear blade; the pick-up/transport head was next moved in an upwards direction, then moved horizontally until it was positioned directly above the mobile cell assembly chamber, and then moved vertically downwards until the severed separator was placed firmly into said assembly chamber; the vacuum was eliminated by bringing air into the vacuum channel in the pick-up/transport head which was then moved vertically upwards and then horizontally until it returned to its original position; and the mobile cell assembly chamber was indexed into position adjacent to the positive plate fabrication station; and (e) The pick-up/transport head of the positive plate fabrication station was moved in downwardly direction until it contacted the upper surface of the uppermost 1.79"×1.26"×0.087" positive plate in the positive plate magazine; a vacuum was applied to said pick-up/transport head; the pick-up/transport head was next moved in an upwards direction, then moved horizontally until it was positioned directly above the mobile cell assembly chamber, and then moved vertically downwards until the positive plate was placed firmly between the battery plate alignment pins in said assembly chamber; the vacuum was eliminated by bringing air into the vacuum channel in the pickup/transport head which was next moved vertically upwards and then horizontally until it returned to its original position: and the mobile cell assembly chamber was indexed into position adjacent to the intermediate separator fabrication station; and (f) A 1.41" length of 2.10"W and 0.086"T porous microfiber glass mat intermediate separator was indexed onto the cutting table of the intermediate separator fabrication table; the pick-up/transport head was moved vertically downward to contact the separator and a vacuum was applied to said pick-up head; the separator was cut to length by the upward movement of the shear blade; the pick-up/transport head was next moved in an upwards direction, then moved horizontally until it was positioned directly above the mobile cell assembly chamber, and then moved vertically downwards until the severed separator was placed firmly into said assembly chamber; the vacuum was eliminated by bringing air into the vacuum channel in the pick-up/transport head which was then moved vertically upwards and then horizontally until it returned to its original position; and the mobile cell assembly chamber was indexed into position adjacent to the negative plate fabrication station; and (g) The pick-up/transport head of the negative plate fabrication station was moved in downwardly direction until it contacted the upper surface of the uppermost 1.79"×1.26"×0.077" negative plate in the negative plate magazine: a vacuum was applied to said pick-up/transport head; the pick-up/transport head was next moved in an upwards direction, then moved horizontally until it was positioned directly above the mobile cell assembly chamber, and then moved vertically downwards until the negative plate was placed firmly between the battery plate alignment pins in said assembly chamber such that the lug of the negative plate was positioned on the side of the cell assembly chamber opposite to the side containing the positive plate lug; the vacuum was eliminated by bringing air into the vacuum channel in the pick-up/transport head which was next moved vertically upwards and then horizontally until it returned to its original position: and the mobile cell assembly chamber was indexed into position adjacent to the intermediate separator fabrication station; and (h) Step (f) was next repeated; and (i) Steps (e), (f), (g), and (a) were next repeated in sequence such that a cell assembly containing two end separators, four positive plates, three negative plates, and six intermediate separators each positioned between one positive plate and one negative plate, was obtained after which the mobile cell assembly chamber was indexed adjacent to the cell insertion station; and (j) The cell compression member of the cell insertion station was next moved vertically downwards into the cell assembly chamber until the cell assembly was compressed to a height of about 0.850"; the battery plate alignment pins were retracted from the cell assembly chamber; and the cell insertion member was moved horizontally towards the battery container until the compressed cell assembly was inserted into the battery container such that approximately 75% of the height of said assembly was inserted into said container; the cell compression member was next moved vertically upwards to its original position; the cell insertion member was returned to its original position; and the mobile cell assembly chamber was indexed to the start position where the completed cell assembly/battery container module was removed manually from said chamber.

The entire cycle described above was completed in approximately 35 seconds.

Cell assemblies produced as described above were constructed into sealed batteries without further relative movement of the positive and negative plates by simultaneously forming integral positive plate straps and posts and negative plate straps and posts by means of a known cast-on-strap technique utilizing a lead-2% tin-0.08% selenium alloy, filling each cell with approximately 35 grams of 1.28 S.G. sulfuric acid, placing and sealing an inner cover and potting the plate straps into said inner cover using a commercially available epoxy cement, inserting a flexible closed-cell polymeric vent cap relative to the vent outlet in said inner cover, and sealing an outer cover to the cell container using the aforesaid epoxy cement.

Figure 12:
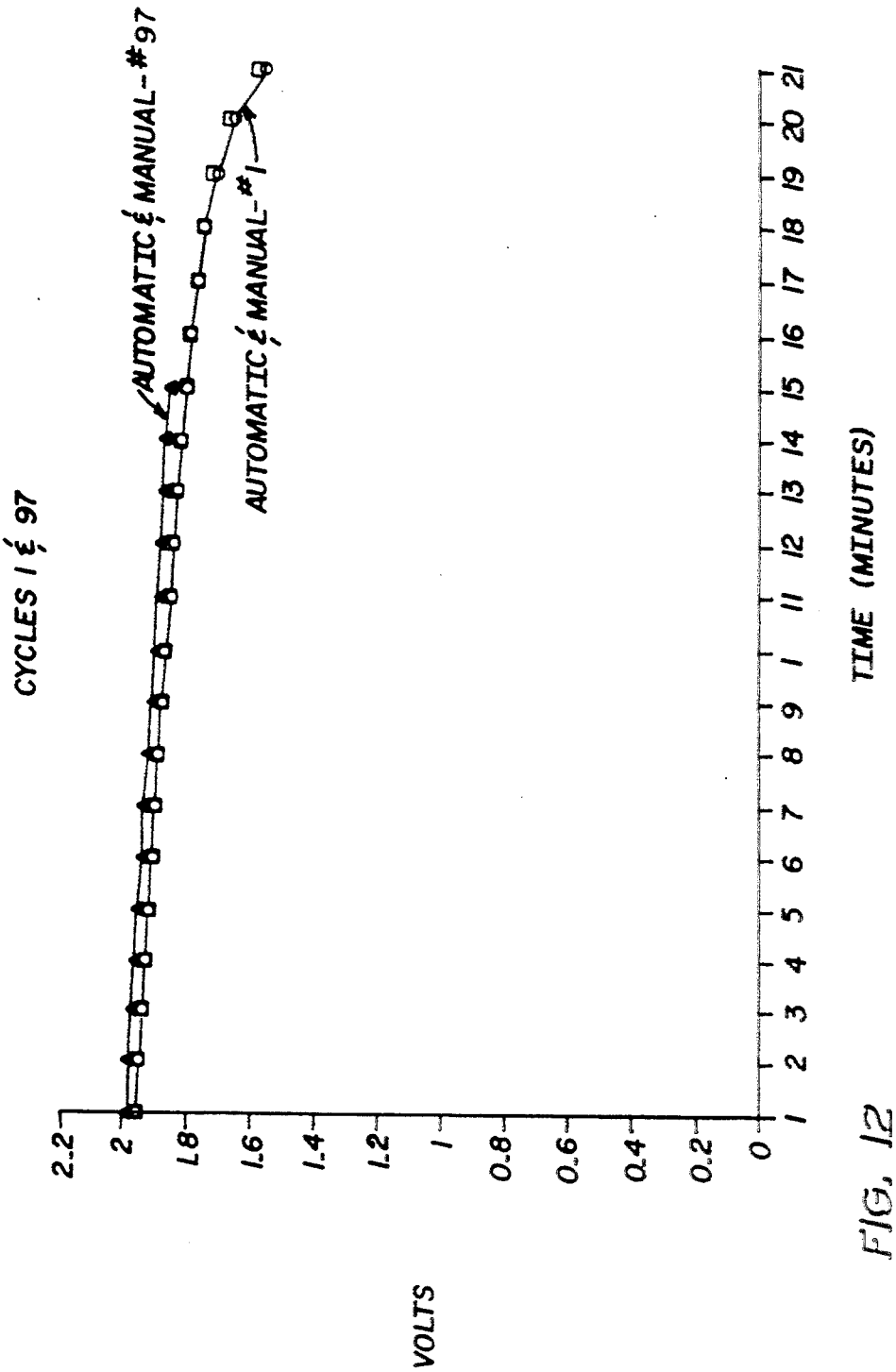
FIG. 12 is a typical discharge curve produced from cycle testing of a cell assembled in accordance with the present invention.

Batteries so produced were charged at a constant voltage of 2.40 volts for approximately eleven hours, discharged at 5 amperes to a cut-off voltage of 1.50 volts, and then cycle tested at a 5-ampere discharge rate using a regime of two 15-minute cycles, two 12-minute cycles, two 8-minute cycles, repeat. FIG. 12 compares typical discharge curves for a battery produced automatically in accordance with the method of this invention and an essentially identical battery for which all steps in the cell assembly operation were performed manually. These data indicate that the capacity and performance of the cell assembled automatically was essentially identical on the first and ninety-seventh cycles to the capacity and performance of the cell that was assembled manually. As will be obvious to those skilled in the art, the performance of the battery in which the cell was assembled in accordance with the method of this invention is typical of that expected from a lead-acid battery of this type.

A preferred approach of establishing the assembly sequentially when the individual elements are cut from the continuous length and subsequent introduction of the cell assembly into the battery cell container has been disclosed, but it will be appreciated that the invention is not so limited. For example, the apparatus may be employed to create the cell assembly by sequential introduction of precut and stacked elements.

While for simplicity of illustration, a specific sequence of cutting the separator stock and plate stock has been illustrated, it will be appreciated by those skilled in the art that other sequences of cutting may be employed so long as a functional arrangement of the assembled plates and separators is achieved.

While for simplicity of disclosure, a system having a single reciprocating assembly chamber has been shown, the invention is not so limited. For example, a plurality of reciprocating assembly chambers moving relative to a plurality of component stations may be employed. Also, a plurality of assembly chambers moving in the same linear path and indexed from component station to component station may be employed. Also, a rotary version having a plurality of assembly chambers moving in a curved or circular path may be employed.

The battery cell container may be indexed to and move with the assembly chamber, if desired, or may be stationary and be aligned where an assembly is to be inserted.

While certain relationships between the number of plates and separators has been directed, the invention is not so limited. For example, the assembly may employ two end separators, one end separator or no end separators. The end separator may be of the same thickness or different thicknesses from the intermediate separators. The number of positive plates may be equal to the number of negative plates or may be one more or one less than each number.

While certain forms of cutting means for severing material from a continuous length have been shown, it will be appreciated that a wide variety of cutting means, including but not limited to, shearing and punching may be employed.

While reference has been made herein to use of electrochemically formed battery plate stock, it will be appreciated that the invention is also usable with assured plate stock.

Whereas, particular embodiments of the invention have been described herein, for purposes of illustration, it will be evident to those skilled in the art that numerous variations of the details may be made without departing from the invention as set forth in the appended claims.

We claim:

1. Apparatus for the automated manufacture of a lead-acid battery comprising
   means for supplying individual positive plates, means for supplying separators, means for supplying individual negative plates, an assembly zone, means for sequentially placing said separator and said individual plates in said assembly zone and establishing an assembly therein, and means for establishing adjacency of said assembly zone adjacent to a battery cell container and means for automatically inserting the assembly of said separator and said individual plates into a battery cell container.

2. The apparatus of claim 1 including
   said means for supplying said separators including a continuous length of separator stock and means for severing individual separators therefrom.

3. The apparatus of claim 2 including
   means for providing an end separator from a continuous length of separator stock, said means for severing including means for severing said end separator, and said assembly zone having means for adding at least one said end separator to said assembly.

4. The apparatus of claim 3 including
   said severing means including cutting means associated with each said means for providing said continuous lengths of separator stock.

5. The apparatus of claim 4 including
   means for moving said assembly zone with respect to said severing means, said means for moving said assembly zone with respect to said severing means and said means for supplying plates being such that after severing each said separator or supplying each said individual plate, said separator or said plate may be delivered to said assembly means directly without intermediate storage.

6. The apparatus of claim 5 including,
   said means for moving said assembly zone moving said assembly zone in a linear path with respect to stationary said severing means and stationary said plate supply means.

7. The apparatus of claim 6 including
   said battery cell container means being disposed adjacent to the path of relative travel of said assembly zone.

8. The apparatus of claim 2 including
   said means for supplying individual plates including a first chamber having at least one magazine containing a stack of positive plates and a second chamber containing at least one magazine containing a stack of negative plates.

9. The apparatus of claim 8 including
   said first chamber and second chamber each containing at least two magazines.

10. The apparatus of claim 9 including
    pick-up means for transporting said plates from said magazines to said assembly zone and means for moving said first and second chambers after a stack of plates in a said magazine has been exhausted and positioning a second magazine having a stack of plates in operative relationship with respect to said pick-up means.

11. The apparatus of claim 10 including
said chambers having openings through which lugs of a stack of plates may project in aligned relationship.

12. The apparatus of claim 11 including
elevator means for vertically raising said stacks of plates being removed by said pick-up means in stages to facilitate removal of the uppermost plate therefrom.

13. The apparatus of claim 9 including
said means for moving said first and second chambers having means for rotating said chambers.

14. The apparatus of claim 1 including
said means for inserting said assembly having means for compressing said assembly prior to said introduction.

15. The apparatus of claim 1 including
means for moving said assembly zone in a reciprocating linear path.

16. The apparatus of claim 1 including
said assembly zone having a plurality of alignment means for securing said plates and separators in desired relative positions.

17. The apparatus of claim 16 including
said alignment means including a plurality of generally spaced upwardly projecting retractable alignment pins.

* * * * *